(12) United States Patent
Harayama

(10) Patent No.: US 10,474,936 B2
(45) Date of Patent: Nov. 12, 2019

(54) COLOR CONVERSION APPARATUS, COLOR CONVERSION METHOD, AND INKJET RECORDING APPARATUS FOR PRODUCING AN IMAGE LAYER WITH IMPROVED PRECISION OF COLOR REPRODUCIBILITY

(71) Applicant: MIMAKI ENGINEERING CO., LTD., Nagano (JP)

(72) Inventor: Kenji Harayama, Nagano (JP)

(73) Assignee: MIMAKI ENGINEERING CO., LTD., Nagano (JP)

( * ) Notice: Subject to any disclaimer, the term of this patent is extended or adjusted under 35 U.S.C. 154(b) by 0 days.

(21) Appl. No.: 15/921,661

(22) Filed: Mar. 15, 2018

(65) Prior Publication Data

US 2018/0268267 A1  Sep. 20, 2018

(30) Foreign Application Priority Data

Mar. 16, 2017 (JP) .................................. 2017-051328

(51) Int. Cl.
  *G06K 15/02* (2006.01)
  *B41J 2/045* (2006.01)
  *B41M 5/00* (2006.01)

(52) U.S. Cl.
  CPC ........ *G06K 15/021* (2013.01); *B41J 2/04501* (2013.01); *B41M 5/0047* (2013.01); *G06K 15/1878* (2013.01); *G06K 2215/0094* (2013.01); *G06K 2215/101* (2013.01)

(58) Field of Classification Search
None
See application file for complete search history.

(56) References Cited

U.S. PATENT DOCUMENTS

| | | | | |
|---|---|---|---|---|
| 2012/0313990 A1* | 12/2012 | Sakai | ..................... | B41J 2/2114 347/12 |
| 2013/0010023 A1* | 1/2013 | Matsunaga | ............ | B41J 2/2056 347/15 |
| 2015/0103901 A1* | 4/2015 | Sato | ...................... | H04N 19/30 375/240.12 |

FOREIGN PATENT DOCUMENTS

JP 5786415 9/2015

* cited by examiner

*Primary Examiner* — Thomas D Lee
(74) *Attorney, Agent, or Firm* — JCIPRNET

(57) ABSTRACT

This disclosure is directed to improving the precision of color reproducibility in a whole image region of any product provided with a base layer(s) regardless of any form of the base layer(s). The RIP (Raster Image Processor) device includes a color conversion processor that applies a color conversion process adapted for presence or absence of a base layer and for a base color to content data representing part or all of details of an image layer at a respective one of positions in an image region indicated by the image layer, and an image layer data generator that generates image layer data representing ejection-related information of ink droplets of a plurality of colors using the content data that has been subjected to the color conversion process.

19 Claims, 12 Drawing Sheets

COLOR CONVERSION APPARATUS, COLOR CONVERSION METHOD, AND INKJET RECORDING APPARATUS FOR PRODUCING AN IMAGE LAYER WITH IMPROVED PRECISION OF COLOR REPRODUCIBILITY

CROSS REFERENCE TO RELATED APPLICATIONS

This application claims the priority benefit of Japanese Patent Application No. 2017-051328, filed on Mar. 16, 2017. The entirety of the above-mentioned patent application is hereby incorporated by reference herein and made a part of this specification.

TECHNICAL FIELD

This disclosure relates to a color conversion apparatus, a color conversion method, and an inkjet recording apparatus that are for use in obtaining a product including a base layer formed on or above a recording medium using ejected ink droplets of a base color and an image layer formed on the recording medium or on the base layer using ejected ink droplets of a plurality of colors.

DESCRIPTION OF THE BACKGROUND ART

Conventionally, inkjet recording apparatuses configured to eject ink droplets of a plurality of colors to form an image on a recording medium have so far been and are being developed in the field of commercial printing. In connection with this known art, a diverse range of image-related techniques have been and are developed to optimally control resulting dot sizes of the ink droplets.

Japanese Patent No. 5786415 (for example, [0006], [0007], and [0015]) describes a method and an apparatus developed to form a cured base layer on a recording medium before forming an image layer. This known art further describes that an image layer thus formed on a smooth and flat base layer may be improved in resolution; and clear (transparent), black, and white (achromatic) are given examples of the base layer color (hereinafter, base color).

SUMMARY

Conventionally, surfaces of recording media may typically differ in properties (for example, surface roughness, wettability), and dot sizes (generally called dot gains) may accordingly vary with types of inks used. This suggests that certain types of inks used to form a base layer may possibly change color reproducibility in an image layer. Japanese Patent No. 5786415 (for example, [0006], [0007], and [0015]), however, is totally silent about possible relevance of the base layer to color reproducibility.

In case of different regions being formed on the same recording medium, for example, 1) region with no base layer, 2) region with a base layer, and 3) regions with different base colors, the precision of color reproducibility may differ from one part to the other in the image region.

To address the issue of the known art, this disclosure provides a color conversion apparatus, a color conversion method, and an inkjet recording apparatus that may improve the precision of color reproducibility in an entire image region of a product provided with a base layer(s) regardless of any form of the base layer(s).

A color conversion apparatus disclosed herein is an apparatus for producing a product including a base layer formed on or above a recording medium using ejected ink droplets of a base color and an image layer formed on the recording medium or on the base layer using ejected ink droplets of a plurality of colors. The color conversion apparatus includes: a color conversion processor that applies a color conversion process adapted for presence or absence of the base layer or for the base color to content data representing part or all of the image layer at a respective one of positions in an image region indicated by the image layer; and an image layer data generator that generates image layer data representing ejection-related information of the ink droplets of the plurality of colors using the content data that has been subjected to the color conversion process by the color conversion processor.

The color conversion apparatus, by thus applying the color conversion process to the content data representing part or all of the image layer in accordance with presence or absence of the base layer or in accordance with the base color, may allow color adjustment of the image layer, taking into consideration any impacts on color reproducibility caused by the base layer immediately below the image layer. This may improve the precision of color reproducibility in a whole image region of any product provided with a base layer(s) regardless of any form of the base layer(s).

According to an aspect, the color conversion apparatus may further include a base layer data generator that generates base layer data representing ejection-related information of the ink droplets of the base color, and the base layer data generator may generate the base layer data equal in resolution to the image layer data. In the apparatus thus further characterized, the ink droplets ejected for the base layer and for the image layer may substantially coincide in position with each other on the recording medium.

According to an aspect, the base layer immediately below the image layer may have, on a surface thereof, a plurality of divided regions each formed with a different type of ink droplets, and the image layer data generator may generate the image layer data depending on the type of ink droplets in a respective one of the plurality of divided regions on the base layer. This may lessen any per-region difference in color reproducibility even when the base layer includes, on its surface, different base layers.

According to an aspect, the recording medium may be transparent, the image layer may include a first image layer and a second image layer, and a background layer may be formed between and in contact with the first image layer and the second image layer. Further, the image layer data generator may generate image layer data used to form the first image layer between the recording medium and the background layer depending on a type of the recording medium or the base layer, and may generate image layer data used to form the second image layer on a surface of the background layer opposite to the first image layer depending on a type of the background layer. A product formed on a transparent recording medium in a manner that the product is observable from both sides, for example, may lessen any difference in color reproducibility between two surfaces on one side and on the other side.

A color conversion method disclosed herein is a method for producing a product including a base layer formed on or above a recording medium using ejected ink droplets of a base color and an image layer formed on the recording medium or on the base layer using ejected ink droplets of a plurality of colors. The color conversion method prompts a computer to carry out: a color conversion step of applying a color conversion process adapted for presence or absence of the base layer or for the base color to content data representing part or all of the image layer at a respective one of positions in an image region indicated by the image layer; and a data generating step of generating image layer data representing ejection-related information of the ink droplets of the plurality of colors using the content data that has been subjected to the color conversion process.

An inkjet recording apparatus disclosed herein includes: any one of the color conversion apparatuses described so far; an ejection part operable to eject ink droplets of a plurality of colors; and an ejection controller programmed for ejection control of the ejection part based on the image layer data obtained by the color conversion apparatus.

The color conversion apparatus, color conversion method, and inkjet recording apparatus disclosed herein may improve the precision of color reproducibility in an entire image region of a product provided with a base layer(s) regardless of any form of the base layer(s).

DETAILED DESCRIPTION OF EMBODIMENTS

With reference to the accompanying drawings, an embodiment of the inkjet recording apparatus disclosed herein is hereinafter described in connection with a color conversion apparatus and a color conversion method.

<Overall Structure of Inkjet Recording Apparatus 10>

Figure 1:
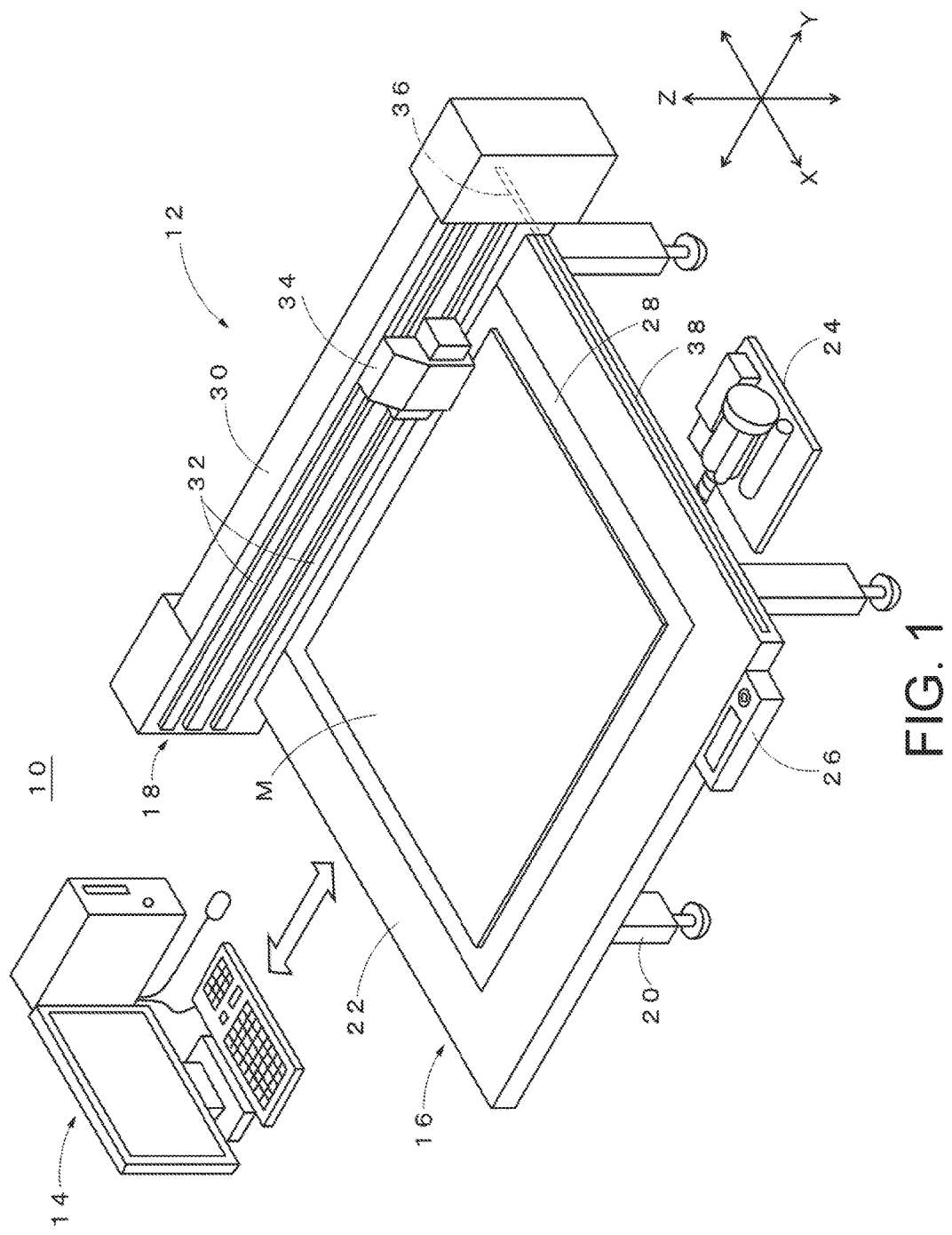
FIG. 1 is a perspective view, illustrating the overall structure of an inkjet recording apparatus according to an embodiment.

FIG. 1 is a perspective view, illustrating the overall structure of an inkjet recording apparatus 10 according to this embodiment. The inkjet recording apparatus 10 includes a printer body 12 operable to print color images or monochromatic images, and an RIP (Raster Image Processor) device 14 (color conversion apparatus) coupled to the printer body 12 in a manner that they are allowed to communicate with each other.

The printer body 12 is a flatbed inkjet printer that forms an image on a recording medium M using inks of a plurality of colors. The printer body 12 essentially includes a body portion 16 and a printing portion 18.

The recording medium M may be any one selected from different media (either permeable or non-permeable) using various materials including paper, unwoven fabric, vinyl chloride, synthesized chemical fiber, polyethylene, polyester, tarpaulin, acrylic plates, and the like. Examples of usable inks may include solvent-based inks (typically, photo-curable inks), aqueous inks (typically, dye inks, pigment inks), and solid inks.

The body portion 16 includes a support base 20 in the form of a frame, a support table 22 secured to a position in the upper direction of the base 20, a vacuum blower 24 coupled to the support table 22, and an operation part 26 including a touch panel display, a speaker, and buttons.

The support table 22 has, at its center part, a suction pad 28 having a number of air holes (not illustrated in the drawing). The vacuum blower 24 is allowed to communicate with the air holes through a decompression chamber (not illustrated in the drawing). By activating and deactivating the vacuum blower 24, the recording medium M can be suctioned to the suction pad 28, and the suctioned recording medium M can be released.

The printing portion 18 includes a first carriage 30 movable in X direction, and a second carriage 34 movable in Y direction along guide rails 32 of the first carriage 30. Guiding projections 36 at both ends of the first carriage 30 are slidably engaged with guiding grooves 38 formed on both sides of the support table 22.

The printer body 12 employs the multi-pass (or shuttle pass) recording technique. The printer body thus structured, moving the first carriage 30 in the sub scanning direction (X direction) and reciprocating the second carriage 34 in the main scanning direction (Y direction), repeatedly ejects ink droplets D (FIG. 2) to the same position on the recording medium M (image region with a predetermined width) to complete an image to be printed. In the illustrated example, the Y direction, or main scanning direction, is orthogonal to the X direction, or sub scanning direction.

<Specific Features of Second Carriage 34>

Figure 2:
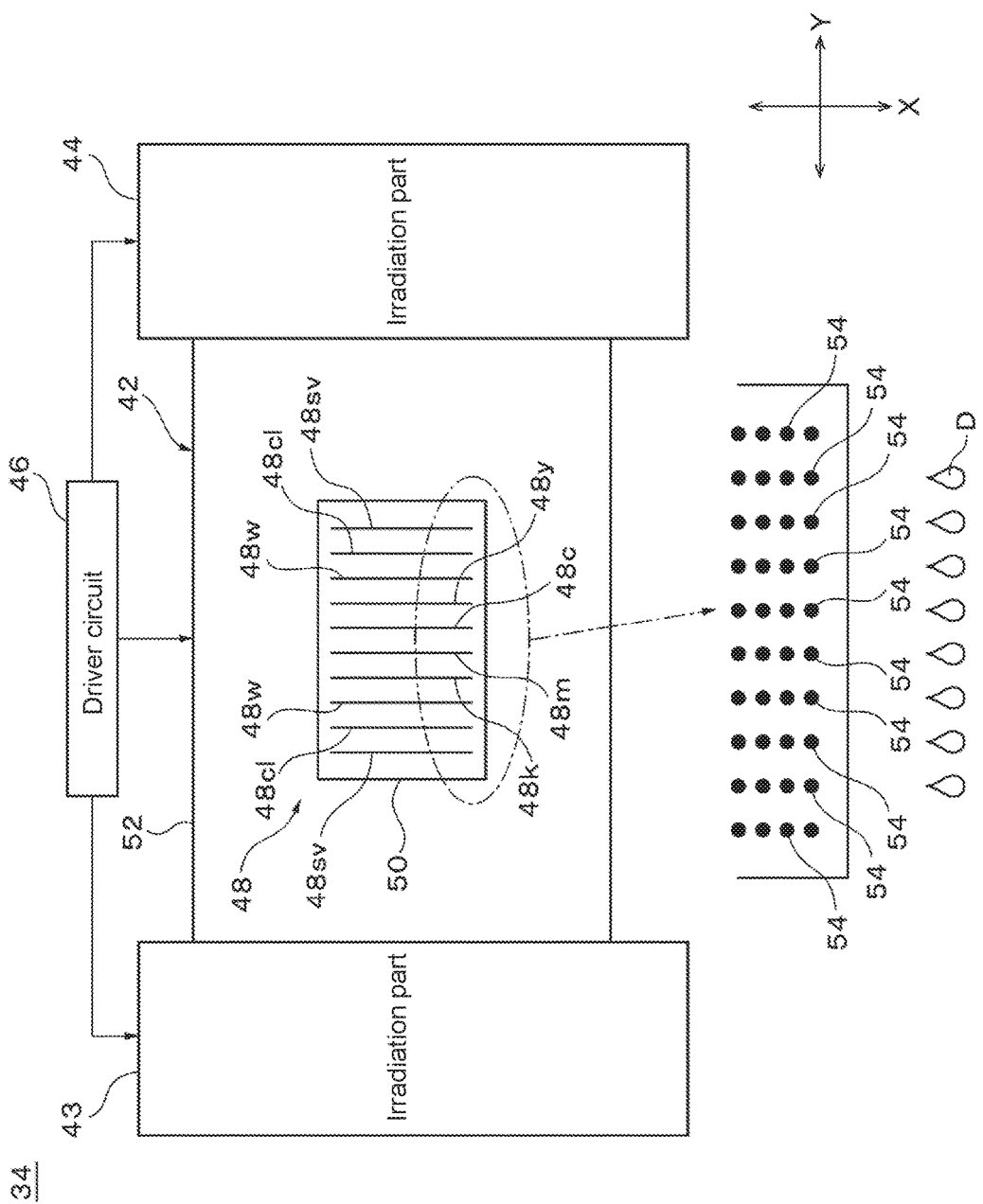
FIG. 2 is an opened-up, schematic plan view of a second carriage illustrated in FIG. 1.

FIG. 2 is an opened-up, schematic plan view of the second carriage 34 illustrated in FIG. 1. The second carriage 34 includes an ejection part 42 that ejects the ink droplets D of two or more different color inks, and irradiation parts 43 and 44 disposed on both sides of the ejection part 42.

The ejection part 42 and the irradiation parts 43 and 44 are electrically coupled to a driver circuit 46 of the body portion 16. The driver circuit 46 is an electric circuit for ejection control of the ejection part 42 and for irradiation control of the irradiation parts 43 and 44.

The irradiation parts 43 and 44 are equipped to radiate active energy line (for example, ultraviolet light) to cure the ink droplets D toward the recording medium M. Examples of ultraviolet light sources may include rare gas discharge lamps, mercury discharge lamps, fluorescent lamps, and LED (Light Emitting Diode) arrays.

The ejection part 42 has one or more nozzle arrays 48, an ejection head 50, and a head holder 52 rectangular in plane view that holds the ejection head 50. Hereinafter, suffix letters (c, m, y, k, w, cl, sv) may be attached to the reference numeral "48" of each nozzle array for distinction.

Various mechanisms may be available to eject the ink droplets D from the ejection head 50. For example, an actuator including piezoelectric elements may be modified to eject the ink droplets D, or air bubbles may be generated by heating ink using a heater (heat generator) to eject the ink droplets D under pressure generated then.

The nozzle array 48y of the ejection head 50 has a plurality of nozzles 54 spaced at equal intervals along the X direction, through which yellow (Y) ink droplets D are ejected. The nozzle array 48c of the ejection head 50 has a plurality of nozzles 54 spaced at equal intervals along the X direction, through which cyan (C) ink droplets D are ejected. The nozzle array 48m of the ejection head 50 has a plurality of nozzles 54 spaced at equal intervals along the X direction, through which magenta (M) ink droplets D are ejected. The nozzle array 48k of the ejection head 50 has a plurality of nozzles 54 spaced at equal intervals along the X direction, through which black (K) ink droplets D are ejected.

The nozzle arrays 48w of the ejection head 50 each have a plurality of nozzles 54 through which white (W) ink droplets D are ejected. These nozzles 54 are disposed on one side and on the other side in the X direction of a block of nozzle arrays 48y, 48c, 48m, and 48k. The nozzle arrays 48cl of the ejection head 50 each have a plurality of nozzles 54 through which clear (CL)-colored ink droplets D are ejected. These nozzles 54 are disposed on one side and on the other side in the X direction of a block of nozzle arrays 48w, 48y, 48c, 48m, 48k, and 48w. The nozzle arrays 48sv of the ejection head 50 each have a plurality of nozzles 54 through which silver (SV) ink droplets D are ejected. These nozzles 54 are disposed on one side and on the other side in the X direction of a block of nozzle arrays 48cl, 48w, 48y, 48c, 48m, 48k, 48w, and 48cl.

The ink colors may be the process colors alone, C (cyan), M (magenta), Y (yellow), and K (black), or these colors may be combined with at least one color selected from LC (light cyan), LM (light magenta), Gy (gray), W (white), CL (clear), and Pr (primer) colors, or may be combined with one or more optionally selected from O (orange), violet, metallic colors (gold, silver), and spot colors (special colors) including fluorescent colors.

Figure 8A:
FIGS. 8A to 8C are time-sequence drawings of steps of producing a product in which a recording medium having an opaque color is used.
Figure 8B:
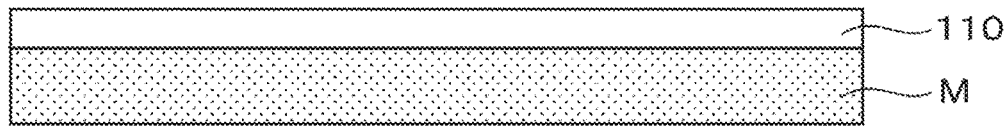
Figure 8C:
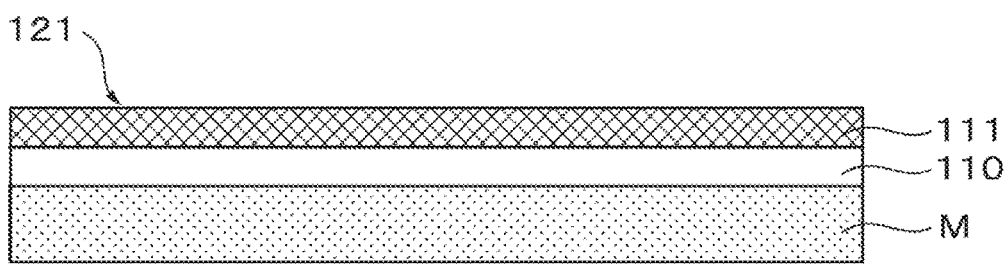

The colors of inks ejected from the ejection part 42 include the color of a base layer 110 (FIGS. 8A to 8C, etc.) (hereinafter, base color). The base color is the color of a primary coating below an image to be printed, typical examples of which may include W (white), CL (clear), Pr (primer), K (black), metallic (silver, gold), and fluorescent colors. The "base color" may be included in colors constituting an image layer 111 (FIGS. 8A to 8C, etc.).

<Electrical Block Diagram of Printer Body 12>

Figure 3:
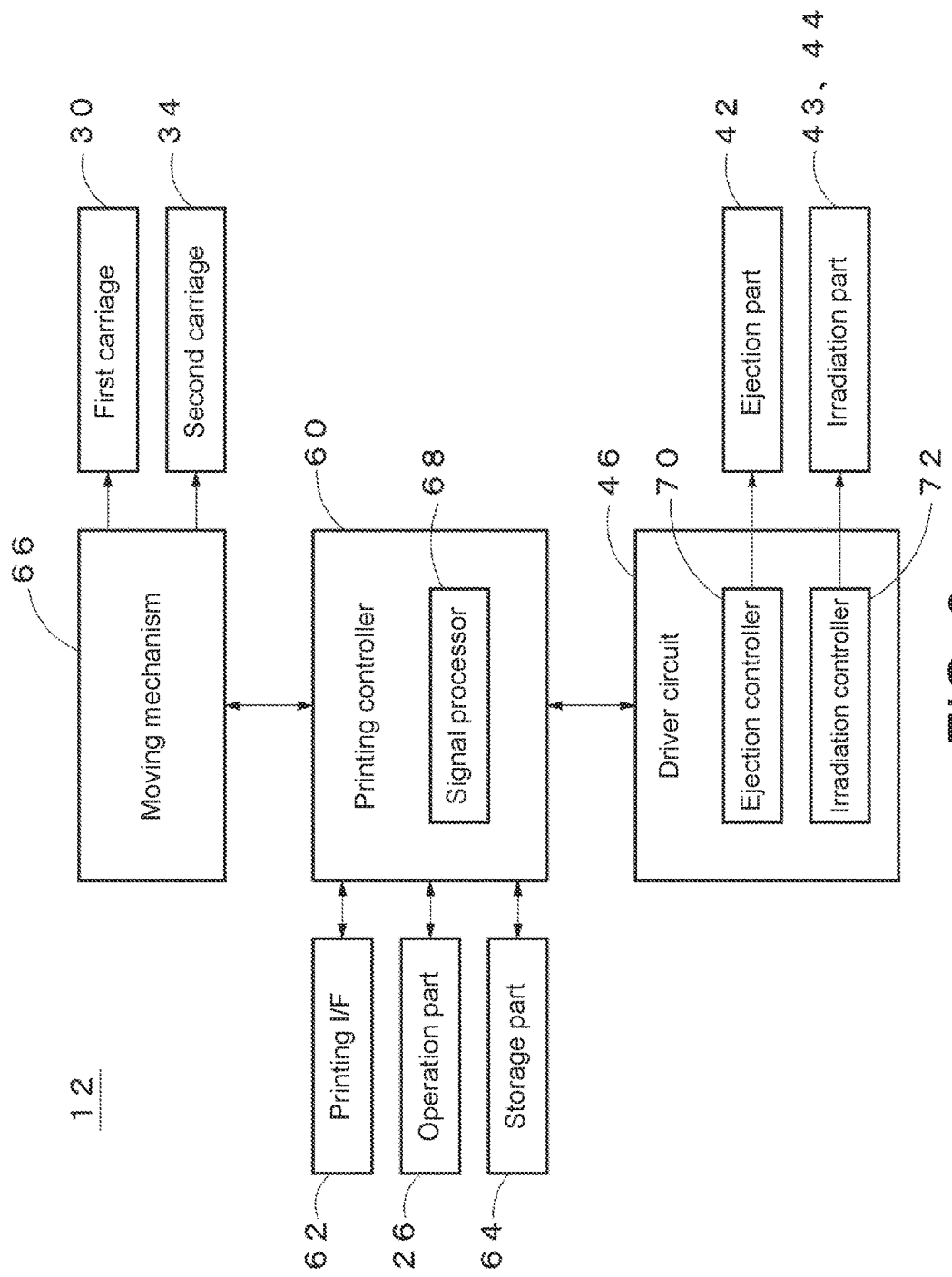
FIG. 3 is an electrical block diagram of a printer body illustrated in FIG. 1.

FIG. 3 is an electrical block diagram of the printer body 12 illustrated in FIG. 1. The printer body 12 includes a printing controller 60, a printing I/F 62, a storage part 64, and a moving mechanism 66, in addition to the operation part 26 (FIG. 1), first carriage 30, second carriage 34, ejection part 42, irradiation parts 43 and 44, and driver circuit 46 (which are all illustrated in FIG. 2).

The printing I/F 62 includes a serial I/F or a parallel I/F, and receives electrical signals including printing data from an RIP device 14. The storage part 64 includes a computer-readable recording medium, a specific example of which may be a memory.

The moving mechanism 66 moves the printing portion 18 in the X and Y directions relative to the recording medium M. In this embodiment, the moving mechanism 66 moves the first carriage 30 in reciprocating motion along the X direction and moves the second carriage 34 in reciprocating motion along the Y direction.

The printing controller 60 may be, for example, a control circuit board including a CPU (Central Processing Unit) or MPU (Micro-Processing Unit) processor. The printing controller 60, by reading programs stored in the storage part 64 and running the read programs, can effectuate required functions including functions of a signal processor 68. Based on dot image data 206 inputted through the printing I/F 62 (data indicating the presence or absence of dots and layout of dots; see FIG. 4), the signal processor 68 generates control signals for ejection control of the ink droplets D, specifically, drive waveform signals for an actuator provided in the ejection head 50.

An ejection controller 70 constituting a part of the driver circuit 46 controls the ejection of inks from the ejection part 42 during relative movements of the printing portion 18 and the recording medium M. For example, the ejection controller 70 may prompt the ink droplets D to be ejected from the nozzle arrays 48 of the ejection head 50 in accordance with the drive waveform signals outputted from the printing controller 60.

An irradiation controller 72 constituting a part of the driver circuit 46 controls the irradiation of light from the irradiation parts 43 and 44 during relative movements of the printing portion 18 and the recording medium M. For example, the irradiation controller 72 may prompt the irradiation parts 43 and 44 to radiate an optimal amount of ultraviolet light in accordance with predefined conditions for light irradiation.

<Electrical Block Diagram of RIP Device 14>

Figure 4:
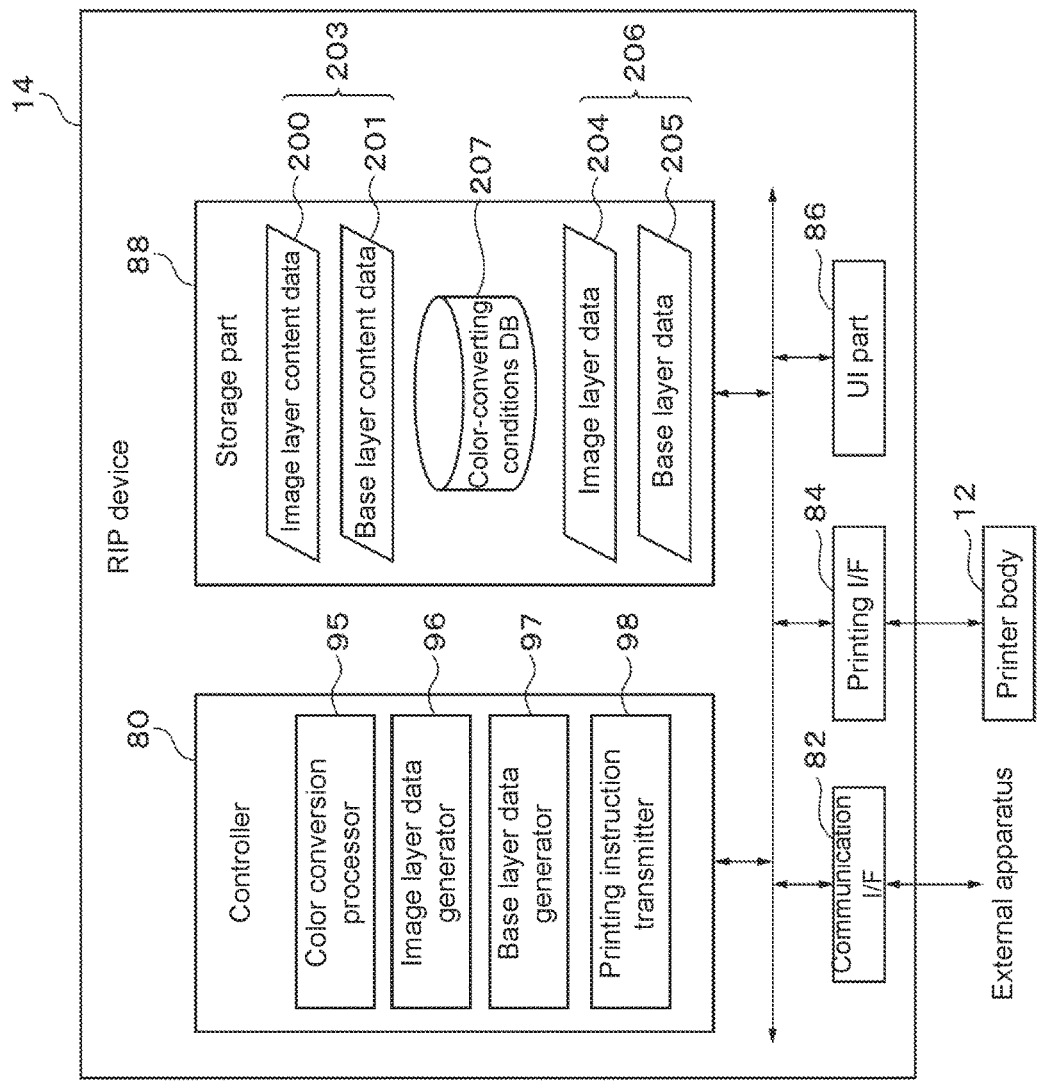
FIG. 4 is an electrical block diagram of an RIP device illustrated in FIG. 1.

FIG. 4 is an electrical block diagram of the RIP device 14 illustrated in FIG. 1. The RIP device 14 is a computer including a controller 80, a communication I/F 82, a printing I/F 84, a UI (user interface) part 86, and a storage part 88.

The communication I/F 82 is an interface used for electrical signals to be transmitted to and received from an external apparatus. Through the communication I/F 82, the RIP device 14 can obtain various pieces of information required to execute printing jobs.

The printing I/F 84 is an interface used for electrical signals to be transmitted to and received from the printer body 12. Based on the printing data supplied from the RIP device 14 (for example, dot image data 206), the printer body 12 carries out a desired printing operation for the recording medium M.

In the UI part 86, input functions using an input device and output functions using an output device are combined to provide a graphical user interface (GUI). The input device includes a mouse, a keyboard, a touch panel, and a microphone. The output device includes a display and a speaker.

The storage part 88 stores programs and data required for the controller 80 to control the structural elements. In the illustrated example, the storage part 88 contains one or a plurality of pieces of content data 203 and dot image data 206, and further includes a database in which conditions for color conversion are compiled (hereinafter, color-converting conditions DB 207). The dot image data 206 includes image layer data 204 representing the image layer 111 (FIGS. 8A to 8, etc.), and base layer data 205 representing the base layer 110 (FIGS. 8A to 8C, etc.).

The storage part 88 may include a non-transitory, computer-readable recording medium. Examples of the computer-readable recording medium may include magneto-optical discs, ROM, CD-ROM, transportable media such as flash memories, and built-in storage devices of computer systems such as hard discs. The recording medium selected and used may be configured to dynamically retain programs in short time or may be configured to retain programs over a certain length of time.

The controller 80 includes a CPU, MPU, or GPU (Graphics Processing Unit) processor. The controller 80, by reading programs stored in the storage part 88 and running the read programs, can effectuate functions of the color conversion processor 95, image layer data generator 96, base layer data generator 97, and printing instruction transmitter 98.

<Operation of Inkjet Recording Apparatus 10>

Figure 5:
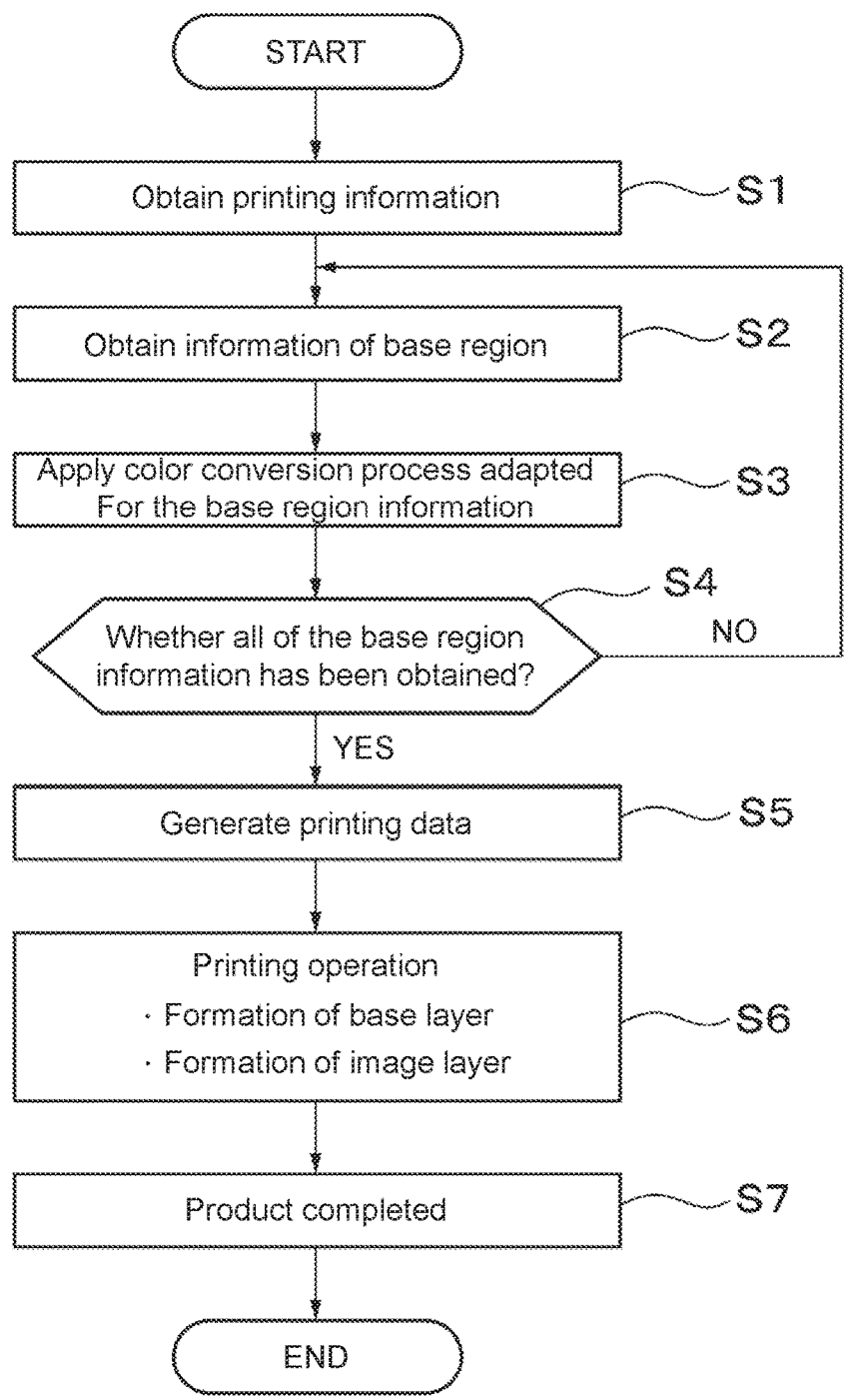
FIG. 5 is a flow chart of steps in the operation of the inkjet recording apparatus illustrated in FIG. 1.
Figure 10:
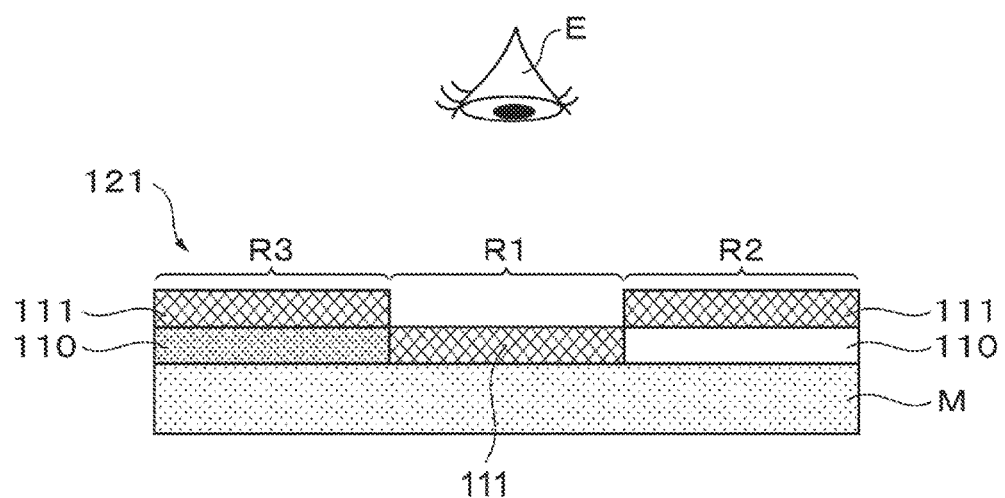
FIG. 10 is a schematic drawing, illustrating a manner of observation of a product in which an image layer is formed.
Figure 12:
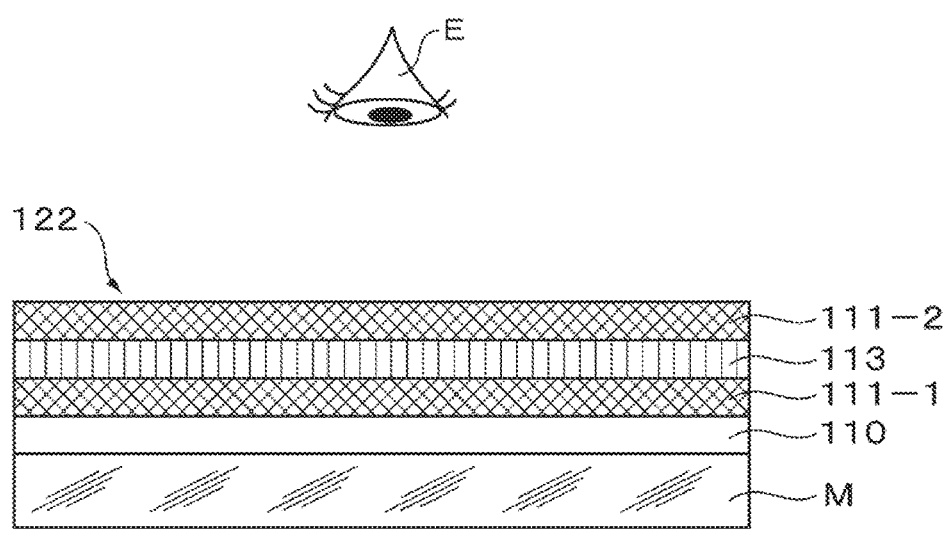
FIG. 12 is a schematic drawing, illustrating a manner of observation of a product in which two image layers are formed.

The inkjet recording apparatus 10 according to this embodiment is characterized as described so far. The operation of the inkjet recording apparatus 10 after the input of an instruction to execute a printing job is hereinafter described with reference mostly to the flow chart of FIG. 5. The description hereinafter given focuses on a color conversion method suitable for layered structures of products 121 and 122 (FIGS. 10 and 12).

In Step S1, the controller 80 of the RIP device 14 obtains printing information suitable for the content data 203 to be printed. Specifically, the controller 80 obtains printing conditions including 1) a printing region within XYZ space including a printable range within the support table 22 and thickness of the recording medium M, and 2) recording resolution, type of the recording medium M, types of inks used.

Figure 6:
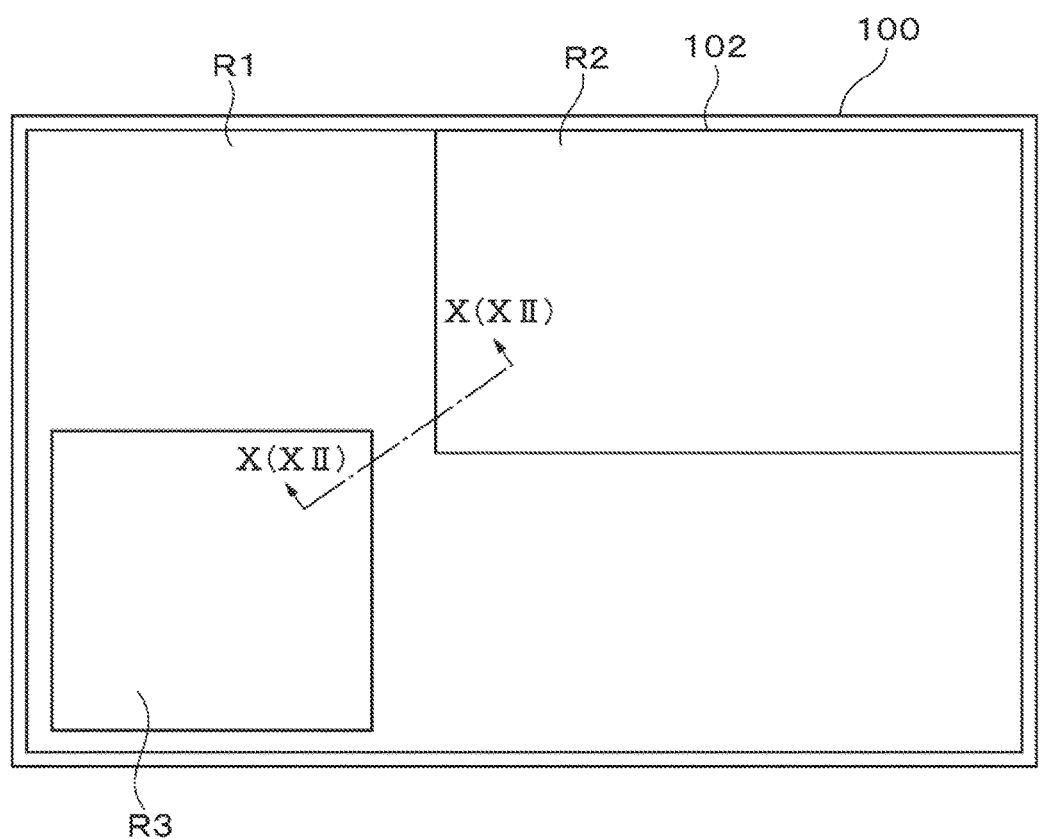
FIG. 6 is a schematic drawing of a relationship among positions of a medium region, an image region, and base regions.

FIG. 6 is a schematic drawing of a relationship among positions of a medium region 100, an image region 102, and base regions R1 to R3 in which different base layers are formed. The medium region 100 is a main surface region on the recording medium M suctioned to the surface of the support table 22 (FIG. 1). The image region 102 is a rectangular region indicating an ink-ejectable area that receives the ink droplets D. This region is disposed on the slightly inner side of the medium region 100.

The base regions R1 to R3 may be decided based on, for example, 1) details and layout of the content data 203, 2) applications of use and manners of observation of products 121 and 122 (FIGS. 10 and 12), 3) types of the recording medium M and inks used, and 4) client's taste and preference, and required specs. In this embodiment, colors of the base regions R1 to R3 (types of inks used) are respectively clear (CL), white (W), and silver (SV). The base regions R1 to R3 may be optional or optimum requirements set in printing conditions of the content data 203.

In Step S2, the color conversion processor 95 reads the content data 203, and obtains then, as well as other printing conditions, information of base layer colors (types of inks used) set in the content data 203.

In Step S3, the color conversion processor 95 performs a color conversion process in accordance with the information of base layer colors (types of inks used) obtained in Step S2. Prior to the color conversion process, the color conversion processor 95 selects one color profile associated with the base layer colors (types of inks used). The color conversion processor 95 then applies the color conversion process to the content data 203 using the color profile selected beforehand.

Figure 7A:
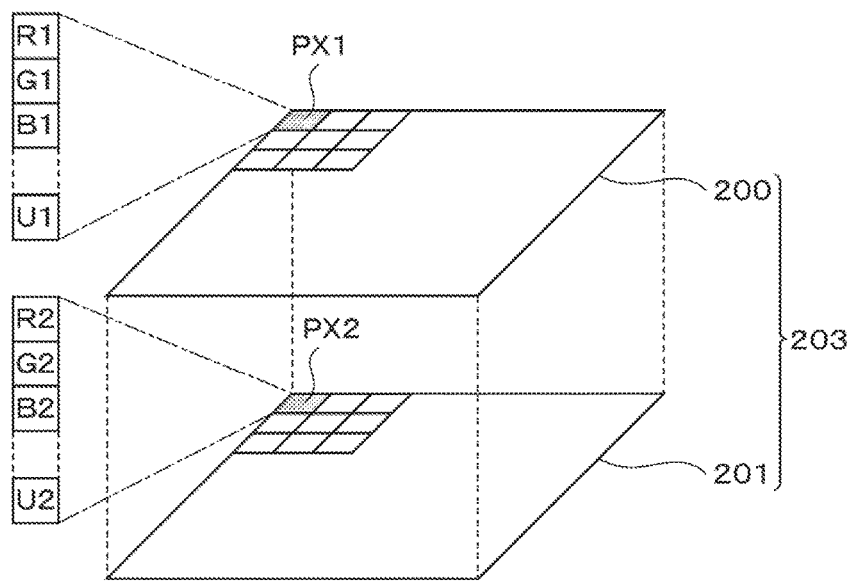
FIGS. 7A and 7B are schematic drawings of exemplified data structures.

FIG. 7A is a schematic drawing of an exemplified data structure of the content data 203, which represents a form of rendered object for one-side observation. The content data 203 includes image layer content data 200 based on which an image is formed, and base layer content data 201. The content data 203 is rasterized, continuous image data having three color channels and one position channel (U). Pixels PX1 and PX2 express colors in continuous tone by differently combining three primary colors, RGB.

In Step S2, the color conversion processor 95 reads the content data 203. The color conversion processor 95 reads both of the image layer content data 200 and the base layer content data 201 having a common value in position channels (U1) of pixels PX1, and obtains information of pixels PX2 of the base layer content data 201 corresponding to the pixels PX1 of the image layer content data 200.

In Step S3, the color conversion processor 95 performs a color conversion process using a color profile adapted for information of the pixel PX2 of the base layer content data 201 obtained in Step S2.

In the data structure illustrated in this drawing, the color conversion processor 95 performs a color conversion process for each pixel PX1 or PX2 using three-dimensional and four-dimensional LUTs constituting part of the color profile.

In Step S4, the color conversion processor 95 determines whether information of the pixels PX2 corresponding to all of the pixels PX1 have been obtained. In the event that any pixels PX2 corresponding to the pixels PX1 are still not obtained (Step S4: NO), the color conversion processor 95 returns to Step S2.

The color conversion processor 95 repeatedly performs Steps S2, S3, and S4 until information of the pixels PX2 corresponding to all of the pixels PX1 are obtained so as to complete the color conversion process of the image layer content data 200 adapted for the base layer content data 201.

In Step S3, the image layer data generator 96 carries out an image process concurrently with the color conversion. Specifically, the image layer data generator 96 generates image layer data 204 representing ejection-related information of the ink droplets D of a plurality of colors using the printing conditions of the content data 203. This image process may include, for example, 1) resolution converting process, 2) rasterizing process, 3) half-tone process, 4), dot size allocating process, and 5) ink quantity control process.

Likewise, the base layer data generator 97 applies a color conversion process to the base layer content data 201 based on the printing conditions to generate the base layer data 205 representing ejection-related information of the ink droplets D of the base color.

Figure 7B:
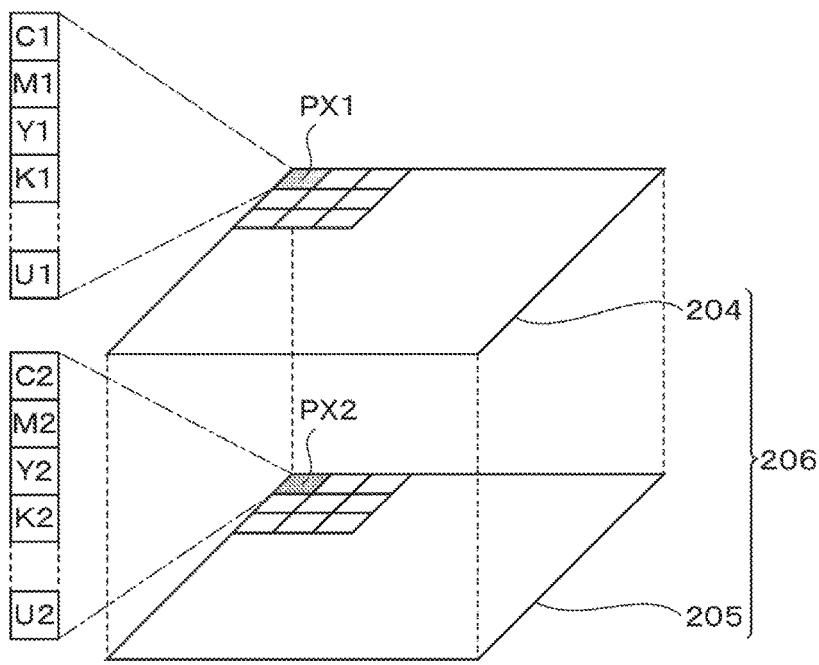

FIG. 7B is a schematic drawing of an exemplified data structure of the dot image data 206 subsequent to the color conversion process in Step S3. By combining the four primary colors of CMYK, the pixels PX1 constituting the image layer data 204 express the presence or absence of dots or dot sizes at respective positions in the image layer 111 (FIGS. 8A to 8C, etc.). The pixels PX2 constituting the base layer data 205 express the presence or absence of dots or type of base color at respective positions in the base layer 110 (FIGS. 8A to 8C) and the base layer 110 (FIGS. 9A to 9D). The dot image data 206 may be rephrased as rasterized multi-value image data including five color channels.

Thus, the base layer data generator 97 may generate, as well as the ejection-related information of the ink droplets D of the base color, the base layer data 205 equal in resolution to the image layer data 204. In the apparatus thus further characterized, the ink droplets D ejected for the base layer 110 and the image layer 111 (FIGS. 8A to 8C, etc.) may substantially coincide in position with each other on the recording medium M.

In Step S5, the printing instruction transmitter 98 transmits the printing data including the dot image data 206 obtained in Step S4 to the printer body 12. The printer body 12 receives the transmitted printing data through the printing I/F 84 (FIG. 4) and the printing I/F 62 (FIG. 3). In this embodiment, the data transmission (Step S5) starts upon completion of the image process (Step S3). Optionally, the image process and the data transmission may proceed concurrently per processing unit of one or plural image arrays.

In Step S6, the printing portion 18 carries out a printing operation in a plurality of passes by prompting the driver circuit 46 and the moving mechanism 66 to operate in conjunction with each other. The "printing operation in a plurality of passes" means moving the first carriage 30 in the X direction plural times (for example, one or more reciprocating motions or two or more one-way movements) to complete an image to be formed.

With reference to the time-sequence drawings of FIGS. 8A to 8C, a description is given below of steps of producing the product 121 in which the recording medium M of an opaque color is used. FIG. 8A illustrates a state prior to the printing operation in the first pass. FIG. 8B illustrates a state prior to the printing operation in the second pass. FIG. 8C illustrates a state subsequent to the printing operation in the second pass.

In the first pass, the ink droplets D that express the base color, for example, white (W) or silver (SV), are ejected from the nozzle arrays 48 of the ejection head 50 (FIG. 2) toward the recording medium M (FIG. 8A). The ejected ink droplets D are cured by being irradiated with ultraviolet light from the irradiation parts 43 and 44 to form the base layer 110 on the recording medium M (FIG. 8B).

In the second pass, the ink droplets D of the process colors (YCMK) are ejected from the nozzle arrays 48*y*, 48*c*, 48*m*, and 48*k* of the ejection head 50 (FIG. 2) toward the recording medium M. The ejected ink droplets D are cured by being irradiated with ultraviolet light from the irradiation parts 43 and 44 to form the image layer 111 on the base layer 110, and the product 121 illustrated in FIG. 8C is finally obtained.

Figure 9A:
FIGS. 9A to 9D are time-sequence drawings of steps of producing a product in which a recording medium having a transparent color is used.
Figure 9B:
Figure 9C:
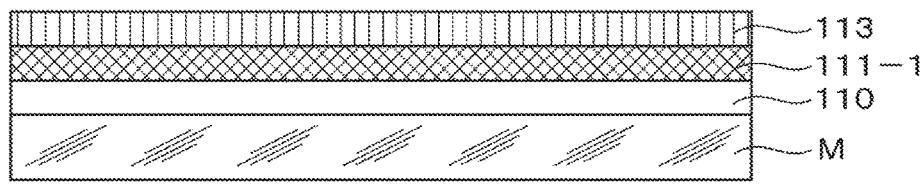
Figure 9D:
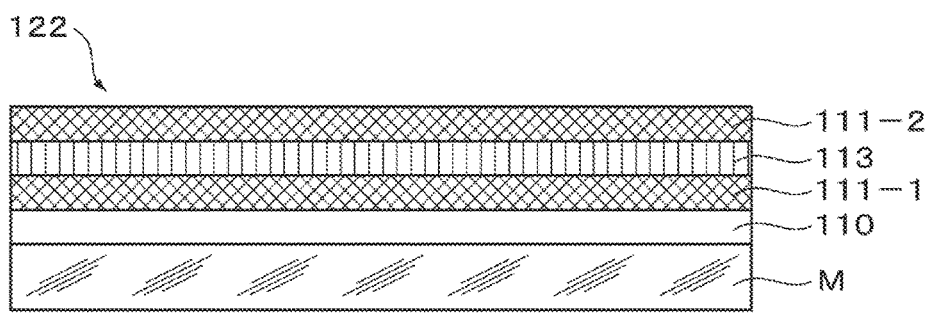

With reference to the time-sequence drawings of FIGS. 9A to 9D, a description is given below of steps of producing the product 122 in which the recording medium M of a transparent color is used. FIG. 9A illustrates a state prior to the printing operation in the first pass. FIG. 9B illustrates a state prior to the printing operation in the second pass. FIG. 9C illustrates a state subsequent to the printing operation in the third pass. FIG. 9D illustrates a state subsequent to the printing operation in the fourth pass.

In the first pass, the clear (CL)-colored ink droplets D are ejected from the nozzle arrays 48*cl* of the ejection head 50 (FIG. 2) toward the recording medium M (FIG. 9A). The ejected ink droplets D are cured by being irradiated with ultraviolet light from the irradiation parts 43 and 44 to form the base layer 110 on the recording medium M (FIG. 9B).

In the second pass, the ink droplets D of the process colors (YCMK) are ejected from the nozzle arrays 48*y*, 48*c*, 48*m*, and 48*k* of the ejection head 50 (FIG. 2) toward the recording medium M. The ejected ink droplets D are cured by being irradiated with ultraviolet light from the irradiation parts 43 and 44 to form a first image layer 111-1 on the base layer 110.

In the third pass, the ink droplets D of the white (W) or silver (SV) color, which is the background color, are ejected from the nozzle arrays 48 of the ejection head 50 (FIG. 2) toward the recording medium M. Then, the ejected ink droplets D are cured by being irradiated with ultraviolet light from the irradiation parts 43 and 44 to form a background layer 113 on the first image layer 111-1.

In the fourth pass, the ink droplets D of the process colors (YCMK) are ejected from the nozzle arrays 48*y*, 48*c*, 48*m*, and 48*k* of the ejection head 50 (FIG. 2) toward the recording medium M. The ejected ink droplets D are cured by being irradiated with ultraviolet light from the irradiation parts 43 and 44 to form a second image layer 111-2 on the background layer 113, and the product 122 illustrated in FIG. 9C is finally obtained.

In Step S7, the production steps for the products 121 and 122 respectively provided with the base layers 110 are completed and over. The products 121 and 122 may be available as commercial printed matters including POP (Point Of Purchase) advertisements, posters on building walls, outdoor advertisements, and signboards.

<Color Reproducibility in Product 121>

FIG. 10 is a cross-sectional view along X-X line of FIG. 6, schematically illustrating a manner of observation of the product 121 having one image layer 111 formed therein. FIG. 10 is more specifically a partial view in cross section of the product 121 illustrated in FIG. 8C.

As illustrated in FIG. 10, the product 121 includes the base layer 110 and the image layer 111 formed thereon on the main surface of the opaque recording medium M. When such a multilayered structure is observed, natural light enters the image layer 111 and is reflected on the image layer 111 or the base layer 110. Then, the reflected light is incident on an observer's eye E. The observer, looking at the product 121 from one side of the product where the image layer 111 is formed, visually recognizes an image expressed by the image layer 111.

In the base region R1, the image layer 111 is directly formed on the recording medium M without the base layer 110 therebetween, and the image layer 111 has a color resulting from the color conversion process specified for the lack of a background layer. In the base region R2, the base layer 110 has a white (W) base color, and the image layer 111 has a color resulting from the color conversion process specified for the color of white (W). In the base region R3, the base layer 110 has a silver (SV) base color, and the image layer 111 has a color resulting from the color conversion process specified for the color of silver (SV).

Possibly, dot gains of the droplets D vary with the surface properties (surface roughness, wettability, etc.) of the base layer 110. To avoid that, the color conversion process is applied to the image layer 111 for each of the base regions R1 to R3. This may improve the precision of color reproducibility in the whole image region 102 (i.e., base regions R1 to R3) of the product 121 provided with the base layer 110 immediately below the image layer 111, regardless of any form of the base layer 110 and/or the presence or absence of the background layer 113.

<Product 122 for Both-Side Observation>

The product 121 may be observed otherwise, instead of "one-side observation", i.e., one image being visually recognizable from one side of a main surface alone. In fact, the product 122 (FIG. 9) for "both-side observation" may be produced, in which two different images are visually recognizable from sides of plural main surfaces.

Figure 11A:
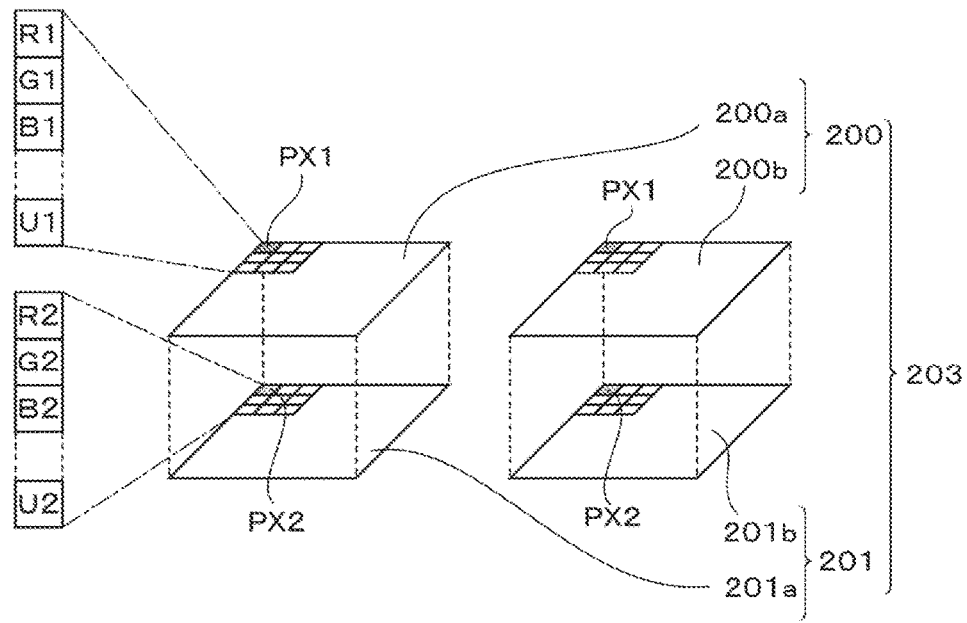
FIGS. 11A and 11B are schematic drawings of exemplified structures of dot image data for a product observable from both sides.
Figure 11B:
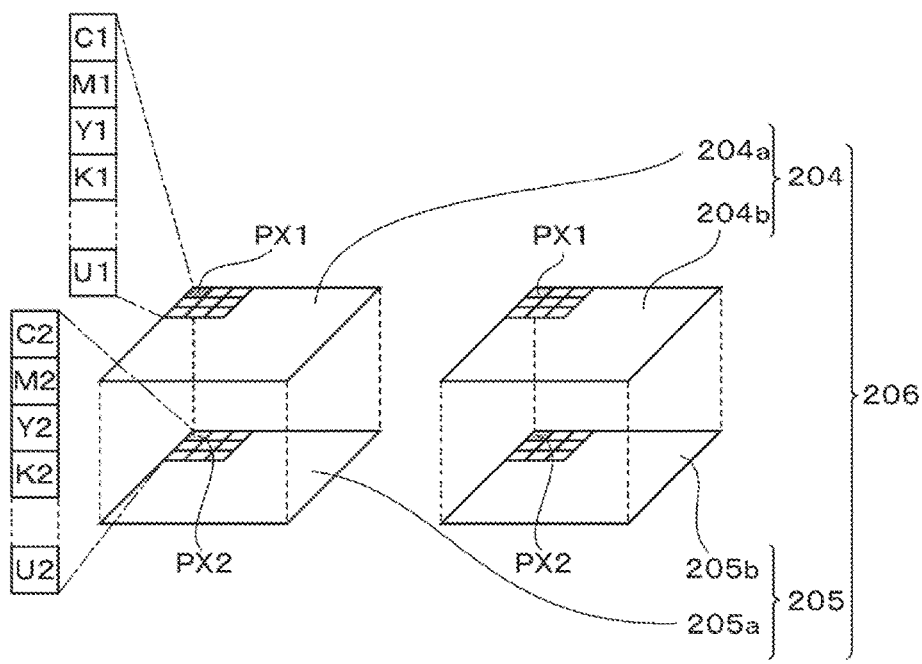

FIGS. 11A and 11B are schematic drawings of exemplified structures of the dot image data 206 for both-side observation. The dot image data 206 may include 1) image layer data 204 including first image layer data 204*a* and second image layer data 204*b*, and 2) base layer data 205 including first base layer data 205*a* and second base layer data 205*b*. This dot image data 206 may be rephrased as rasterized multi-value image data including 10 color channels.

The dot sizes of the first image layer 111-1 closer than the other image layer to the recording medium M may be affected by the base layer 110 immediately therebelow, while dot sizes of the second image layer 111-2 formed on the background layer 113 may be affected by the background layer 113 immediately therebelow.

It is required of products for both-side observation, such as the product 122, that images on different sides should be as equal as possible in color reproducibility when observed from one side of the product 122 closer to the recording medium M and from another side of the product 122 closer to the second image layer 111-2.

FIG. 11A is a schematic drawing of an exemplified data structure of the content data 203, which represents a form of rendered object for both-side observation. FIG. 11B is a schematic drawing of an exemplified data structure of the dot image data for both-side observation subsequent to the color conversion process.

Any aspects of the color conversion process distinct from one-side observation alone are hereinafter described, with reference to these schematic drawings of exemplified structures of the dot image data 206 for both-side observation.

The color conversion processor 95 selects first base layer content data 201a as the base layer content data 201 of the first image layer content data 200a. Then, the color conversion processor 95, through comparison of the first position channel (U1) of the pixel PX1 in the first image layer content data 200a and the second position channel (U2) of the pixel PX2 in the first base layer content data 201a, identifies the pixel PX2 of the first base layer content data 201a corresponding to the pixel PX1 of the first image layer content data 200a.

Next, the color conversion processor 95 selects one color profile associated based on a second group of channels (R2, G2, B2) of the identified pixel PX2 in the first base layer content data 201a, and applies the color conversion process to a first group of channels (R1, G1, B1) of the first image layer content data 200a to generate first image layer data 204a. The pixels PX1 constituting the first image layer data 204a subsequent to the color conversion express the presence or absence of dots and/or dot sizes in the first image layer 111-1 (FIGS. 9A to 9D) using a first group of channels (C1, M1, Y1, K1). The pixels PX1 constituting the first image layer data 204a each express position-related information of the pixel PX1 at the first position channel (U1).

The color conversion processor 95 applies the processes described so far to all of the pixels PX1 in the first image layer content data 200a.

The color conversion processor 95, as in the first image layer content data 200a, applies the color conversion process to the second image layer content data 200b.

The color conversion processor 95 selects background layer content data 201b as the base layer content data 201 of the second image layer content data 200b. Then, the color conversion processor 95, through comparison of the first position channel (U1) of the pixel PX1 in the second image layer content data 200b and the second position channel (U2) of the pixel PX2 in the background layer content data 201b, identifies the pixel PX2 of the background layer content data 201b corresponding to the pixel PX1 of the second image layer content data 200b.

Next, the color conversion processor 95 selects one color profile associated based on a second group of channels (R2, G2, B2) of the identified pixel PX2 in the background layer content data 201b, and applies the color conversion to a first group of channels (R1, G1, B1) of the second image layer content data 200b to generate second image layer data 204b. The pixels PX1 constituting the second image layer data 204b subsequent to the color conversion express the presence or absence of dots and/or dot sizes in the second image layer 111-2 (FIGS. 9A to 9D) using a first group of channels (C1, M1, Y1, K1). The pixels PX1 constituting the second image layer data 204b each express position-related information of the pixel PX1 at the first position channel (U1).

The color conversion processor 95 applies the processes described so far to all of the pixels PX1 in the second image layer content data 200b.

As a result, the product 122 including the background layer 113 formed on the first image layer 111-1 and the second image layer 111-2 formed on the background layer 113 is improved in the precision of color reproducibility, irrespective of any form of the base layer (base layer 110, background layer 113) at the time of forming the image layers (first image layer 111-1, second image layer 111-2). In the product 122 for both-side observation, therefore, images on different sides may be as equal as possible in color reproducibility when observed from one side of the product 122 closer to the recording medium M and from another side of the product 122 closer to the second image layer 111-2. Thus, any difference in color reproducibility may be diminished between one surface side (first image layer 111-1) and the other surface side (second image layer 111-2).

The dot image data 206 subsequent to the color conversion includes image data of the base layer 110, first image layer 111-1, background layer 113, and second image layer 111-2 of the product 122.

The dot image data 206 includes 1) the image layer data 204 including the first image layer data 204a and the second image layer data 204b, and 2) the base layer (background layer) data 205 including the first base layer (background layer) data 205a and the second base layer (background layer) data 205b. This dot image data 206 may be rephrased as rasterized multi-value image data including 10 color channels.

The pixels PX1 constituting the first image layer data 204a express the presence or absence of dots and/or dot sizes in the first image layer 111-1 (FIGS. 9A to 9D) using a first group of channels (C1, M1, Y1, K1). The pixels PX1 constituting the first image layer data 204a each express position-related information of the pixel PX1 at the first position channel (U1).

Similarly to the first image layer data 204a, the pixels PX2 constituting the first base layer data 205a for the base layer 110 express the presence or absence of dots and/or dot sizes in the base layer 110 using a second group of channels (C2, M2, Y2, K2). The pixels PX2 constituting the first base layer data 205a each express position-related information of the pixel PX2 at the second position channel (U2).

Effects of the Embodiment

The effects attained by this embodiment are summarized below. The RIP device 14 is 1) a device that forms the base layer 110 on or above the recording medium M using ink droplets D ejected for the base layer 110, and forms the image layer 111 on the recording medium M or on the base layer 110 using the ejected ink droplets D of a plurality of colors to obtain the product 121, 122.

The RIP device 14 includes the following structural elements: 2) color conversion processor 95 that applies a color conversion process adapted for the presence or absence of the base layer 110 or for the base color to the content data 203 representing part or all of details of the image layer 111 at a respective one of positions in the image region 102 indicated by the image layer 111, and 3) image layer data generator 96 that generates the image layer data 204 representing ejection-related information of the ink droplets D of a plurality of colors using the content data 203 that has been subjected to the color conversion process by the color conversion processor 95.

The inkjet recording apparatus 10 includes the following structural elements: 1) RIP device 14 described above, 2) ejection part 42 operable to eject the ink droplets D of a plurality of colors, and 3) ejection controller 70 programmed for ejection control of the ejection part 42 based on the image layer data 204 obtained by the RIP device 14.

The color conversion method disclosed herein prompts a computer (RIP device 14 in this description) to carry out the following steps: 1) processing step (S3) of applying a color conversion process adapted for the presence or absence of the base layer 110 or for the base color to the content data 203 representing part or all of details of the image layer 111 at a respective one of positions in the image region 102 indicated by the image layer 111, and 2) generating step (S5) of generating the image layer data 204 representing ejection-related information of the ink droplets D of a plurality of colors using the content data 203 that has been subjected to the color conversion process.

These structural and technical features may allow color adjustment of the image layer 111, taking into consideration any impacts on color reproducibility caused by the base layer 110 immediately below the image layer 111. This may improve the precision of color reproducibility in the whole image region 102 of the product 121, 122 provided with the base layer 110, regardless of any form of the base layer 110.

<Additional Remarks>

The embodiment described so far is a non-limiting example of this disclosure. It should be understood that any technical aspects disclosed herein may be variously modified within the scope and spirit of this disclosure.

The moving mechanism 66 moves the ejection part 42, with the recording medium M being immovably secured to a position. This is a non-limiting example of relative movement between the ejection part 42 and the recording medium M. For instance, the recording medium M alone may be moved, or the recording medium M and the ejection part 42 may be both moved relative to each other.

The inkjet recording apparatus 10 according to this embodiment includes two separate devices (printer body 12 and RIP device 14), which is a non-limiting structural example. The inkjet recording apparatus may be a monolithic apparatus in which all of image processing functions including the color conversion process are consolidated in the printer body 12.

What is claimed is:

1. A color conversion apparatus for producing a product including a base layer formed on or above a recording medium using ejected ink droplets of a base color and an image layer formed on the recording medium or on the base layer using ejected ink droplets of a plurality of colors, the color conversion apparatus comprising:
    a color conversion processor that applies a color conversion process adapted for presence or absence of the base layer or for the base color, with respect to an image layer content data representing part or all of the image layer and a base layer content data representing part or all of the base layer corresponding to the image layer content data, at a respective one of positions in an image region indicated by the image layer; and
    an image layer data generator that generates image layer data representing ejection-related information of the ink droplets of the plurality of colors using the image layer content data that has been subjected to the color conversion process by the color conversion processor,
    wherein the image layer data includes the ejection-related information generated using a printing condition included in the image layer content data adapted for the base layer content data,
    wherein the color conversion processor reads both of the image layer content data and the base layer content data having a common value in position channels, and performs the color conversion process of the image layer content data adapted for the base layer content data.

2. The color conversion apparatus according to claim 1, further comprising a base layer data generator that generates base layer data representing ejection-related information of the ink droplets of the base color, wherein
    the base layer data generator generates the base layer data equal in resolution to the image layer data.

3. The color conversion apparatus according to claim 2, wherein
    the base layer immediately below the image layer has, on a surface thereof, a plurality of divided regions each formed with a different type of ink droplets, and
    the image layer data generator generates the image layer data depending on the type of ink droplets in a respective one of the plurality of divided regions on the base layer.

4. The color conversion apparatus according to claim 3, wherein
    the recording medium is transparent,
    the image layer includes a first image layer and a second image layer, a background layer is formed between and in contact with the first image layer and the second image layer,
    the image layer data generator generates image layer data used to form the first image layer between the recording medium and the background layer depending on a type of the recording medium or the base layer, and
    the image layer data generator further generates image layer data used to form the second image layer on a surface of the background layer opposite to the first image layer depending on a type of the background layer.

5. The color conversion apparatus according to claim 2, wherein
    the recording medium is transparent,
    the image layer includes a first image layer and a second image layer, a background layer is formed between and in contact with the first image layer and the second image layer,
    the image layer data generator generates image layer data used to form the first image layer between the recording medium and the background layer depending on a type of the recording medium or the base layer, and
    the image layer data generator further generates image layer data used to form the second image layer on a surface of the background layer opposite to the first image layer depending on a type of the background layer.

6. The color conversion apparatus according to claim 1, wherein
    the base layer immediately below the image layer has, on a surface thereof, a plurality of divided regions each formed with a different type of ink droplets, and
    the image layer data generator generates the image layer data depending on the type of ink droplets in a respective one of the plurality of divided regions on the base layer.

7. The color conversion apparatus according to claim 6, wherein
    the recording medium is transparent,
    the image layer includes a first image layer and a second image layer, a background layer is formed between and in contact with the first image layer and the second image layer, the image layer data generator generates image layer data used to form the first image layer between the recording medium and the background layer depending on a type of the recording medium or the base layer, and the image layer data generator further generates image layer data used to form the second image layer on a surface of the background layer opposite to the first image layer depending on a type of the background layer.

8. The color conversion apparatus according to claim 1, wherein the recording medium is transparent, the image layer includes a first image layer and a second image layer, a background layer is formed between and in contact with the first image layer and the second image layer, the image layer data generator generates image layer data used to form the first image layer between the recording medium and the background layer depending on a type of the recording medium or the base layer, and the image layer data generator further generates image layer data used to form the second image layer on a surface of the background layer opposite to the first image layer depending on a type of the background layer.

9. An inkjet recording apparatus comprising:

the color conversion apparatus according to claim 1;

an ejection part operable to eject ink droplets of a plurality of colors; and an ejection controller programmed for ejection control of the ejection part based on the image layer data obtained by the color conversion apparatus.

10. The inkjet recording apparatus according to claim 9, wherein the color conversion apparatus further comprises a base layer data generator that generates base layer data representing ejection-related information of the ink droplets of the base color, wherein the base layer data generator generates the base layer data equal in resolution to the image layer data.

11. The inkjet recording apparatus according to claim 10, wherein the base layer immediately below the image layer has, on a surface thereof, a plurality of divided regions each formed with a different type of ink droplets, and the image layer data generator generates the image layer data depending on the type of ink droplets in a respective one of the plurality of divided regions on the base layer.

12. The inkjet recording apparatus according to claim 11, wherein the recording medium is transparent, the image layer includes a first image layer and a second image layer, a background layer is formed between and in contact with the first image layer and the second image layer, the image layer data generator generates image layer data used to form the first image layer between the recording medium and the background layer depending on a type of the recording medium or the base layer, and the image layer data generator further generates image layer data used to form the second image layer on a surface of the background layer opposite to the first image layer depending on a type of the background layer.

13. The inkjet recording apparatus according to claim 10, wherein the recording medium is transparent, the image layer includes a first image layer and a second image layer, a background layer is formed between and in contact with the first image layer and the second image layer, the image layer data generator generates image layer data used to form the first image layer between the recording medium and the background layer depending on a type of the recording medium or the base layer, and the image layer data generator further generates image layer data used to form the second image layer on a surface of the background layer opposite to the first image layer depending on a type of the background layer.

14. The inkjet recording apparatus according to claim 9, wherein the base layer immediately below the image layer has, on a surface thereof, a plurality of divided regions each formed with a different type of ink droplets, and the image layer data generator generates the image layer data depending on the type of ink droplets in a respective one of the plurality of divided regions on the base layer.

15. The color conversion apparatus according to claim 14, wherein the recording medium is transparent, the image layer includes a first image layer and a second image layer, a background layer is formed between and in contact with the first image layer and the second image layer, the image layer data generator generates image layer data used to form the first image layer between the recording medium and the background layer depending on a type of the recording medium or the base layer, and the image layer data generator further generates image layer data used to form the second image layer on a surface of the background layer opposite to the first image layer depending on a type of the background layer.

16. The inkjet recording apparatus according to claim 9, wherein the recording medium is transparent, the image layer includes a first image layer and a second image layer, a background layer is formed between and in contact with the first image layer and the second image layer, the image layer data generator generates image layer data used to form the first image layer between the recording medium and the background layer depending on a type of the recording medium or the base layer, and the image layer data generator further generates image layer data used to form the second image layer on a surface of the background layer opposite to the first image layer depending on a type of the background layer.

17. The color conversion apparatus according to claim 1, wherein the ejection-related information is formed by an image process including: a resolution converting process of the image layer content data, a rasterizing process, a half-tone process, a dot size allocating process, and an ink quantity control process.

18. A color conversion method for producing a product including a base layer formed on or above a recording medium using ejected ink droplets of a base color and an image layer formed on the recording medium or on the base layer using ejected ink droplets of a plurality of colors, the color conversion method prompting a computer to carry out:

a color conversion step of applying a color conversion process adapted for presence or absence of the base layer or for the base color, with respect to an image layer content data representing part or all of the image layer and a base layer content data representing part or all of the base layer corresponding to the image layer content data, at a respective one of positions in an image region indicated by the image layer; and a data generating step of generating image layer data representing ejection-related information of the ink droplets of the plurality of colors using the image layer content data that has been subjected to the color conversion process, wherein the image layer data includes the ejection-related information generated using a printing condition included in the image layer content data adapted for the base layer content data, wherein the color conversion step reads both of the image layer content data and the base layer content data having a common value in position channels, and performs the color conversion process of the image layer content data adapted for the base layer content data.

19. The color conversion method according to claim 18, wherein the ejection-related information is formed by an image process including: a resolution converting process of the image layer content data, a rasterizing process, a half-tone process, a dot size allocating process, and an ink quantity control process.

* * * * *